(12) United States Patent
Takayanagi (10) Patent No.: US 7,710,471 B2
(45) Date of Patent: May 4, 2010

(54) PIXEL INDIVIDUAL ANTI-ECLIPSE CIRCUIT AND ITS OPERATION MANNER

(75) Inventor: Isao Takayanagi, Tokyo (JP)

(73) Assignee: Aptina Imaging Corporation, Grand Cayman (KY)

( * ) Notice: Subject to any disclaimer, the term of this patent is extended or adjusted under 35 U.S.C. 154(b) by 1001 days.

(21) Appl. No.: 11/179,632

(22) Filed: Jul. 13, 2005

(65) Prior Publication Data

US 2006/0278809 A1    Dec. 14, 2006

(30) Foreign Application Priority Data

Jun. 14, 2005    (JP)    ............... 2005-173861

(51) Int. Cl.
*H04N 9/64* (2006.01)
(52) U.S. Cl. .................. 348/243; 348/241; 348/251
(58) Field of Classification Search ................ 348/308, 348/243, 241, 251; 250/208.1
See application file for complete search history.

(56) References Cited

U.S. PATENT DOCUMENTS

| | | | |
|---|---|---|---|
| 5,289,118 A * | 2/1994 | Crisafulli | ................ 324/761 |
| 6,140,630 A | 10/2000 | Rhodes | |
| 6,204,524 B1 | 3/2001 | Rhodes | |
| 6,310,366 B1 | 10/2001 | Rhodes et al. | |
| 6,326,652 B1 | 12/2001 | Rhodes | |
| 6,333,205 B1 | 12/2001 | Rhodes | |
| 6,376,868 B1 | 4/2002 | Rhodes | |
| 6,803,958 B1 | 10/2004 | Wang | |
| 2004/0036783 A1 | 2/2004 | Barna | |
| 2004/0119853 A1* | 6/2004 | Kokubun et al. | ............ 348/241 |
| 2006/0044414 A1 | 3/2006 | Lee et al. | |
| 2006/0238634 A1* | 10/2006 | Yan | ............................ 348/308 |
| 2006/0256220 A1* | 11/2006 | Rysinski et al. | ............. 348/308 |

* cited by examiner

*Primary Examiner*—David L Ometz
*Assistant Examiner*—Antoinette T Spinks
(74) *Attorney, Agent, or Firm*—Dickstein Shapiro LLP (57) ABSTRACT

An anti-eclipse circuit of an image pixel includes a pixel coupled to a pixel output line and a circuit for receiving and storing a pixel reset voltage from the pixel on the pixel output line and for using the stored pixel reset voltage as a parameter to control a reset voltage level on the output line in a manner which maintains the pixel reset voltage on the pixel output line above a predetermined minimum voltage.

24 Claims, 10 Drawing Sheets

PIXEL INDIVIDUAL ANTI-ECLIPSE CIRCUIT AND ITS OPERATION MANNER

FIELD OF INVENTION

The present invention relates generally to semiconductor imagers. More specifically, the present invention relates to an anti-eclipse circuit for imagers.

BACKGROUND OF THE INVENTION

A CMOS imager circuit includes a focal plane array of pixel cells, each one of the cells including a photosensor, for example, a photogate, photoconductor or a photodiode for accumulating photo-generated charge in a specified portion of a substrate. Each pixel cell has a charge storage region, formed on or in the substrate, which is connected to the gate of an output transistor that is part of a readout circuit. The charge storage region may be constructed as a floating diffusion region. In some imager circuits, each pixel may include at least one electronic device such as a transistor for transferring charge from the photosensor to the storage region and one device, also typically a transistor, for resetting the storage region to a predetermined charge level prior to charge transference.

In a CMOS imager, the active elements of a pixel cell perform the functions of: (1) photon to charge conversion; (2) accumulation of image charge; (3) resetting the storage region to a known state; (4) transfer of charge to the storage region; (5) selection of a pixel for readout; and (6) output and amplification of a signal representing the charge at the storage region. Photo-charge may be amplified when it moves from the initial charge accumulation region to the storage region. The charge at the storage region is typically converted to a pixel output voltage by a source follower output transistor.

CMOS imagers of the type discussed above are generally known as discussed, for example, in U.S. Pat. Nos. 6,140,630, 6,376,868, 6,310,366, 6,326,652, 6,204,524 and 6,333,205, assigned to Micron Technology, Inc., which are hereby incorporated by reference in their entirety.

Figure 1:
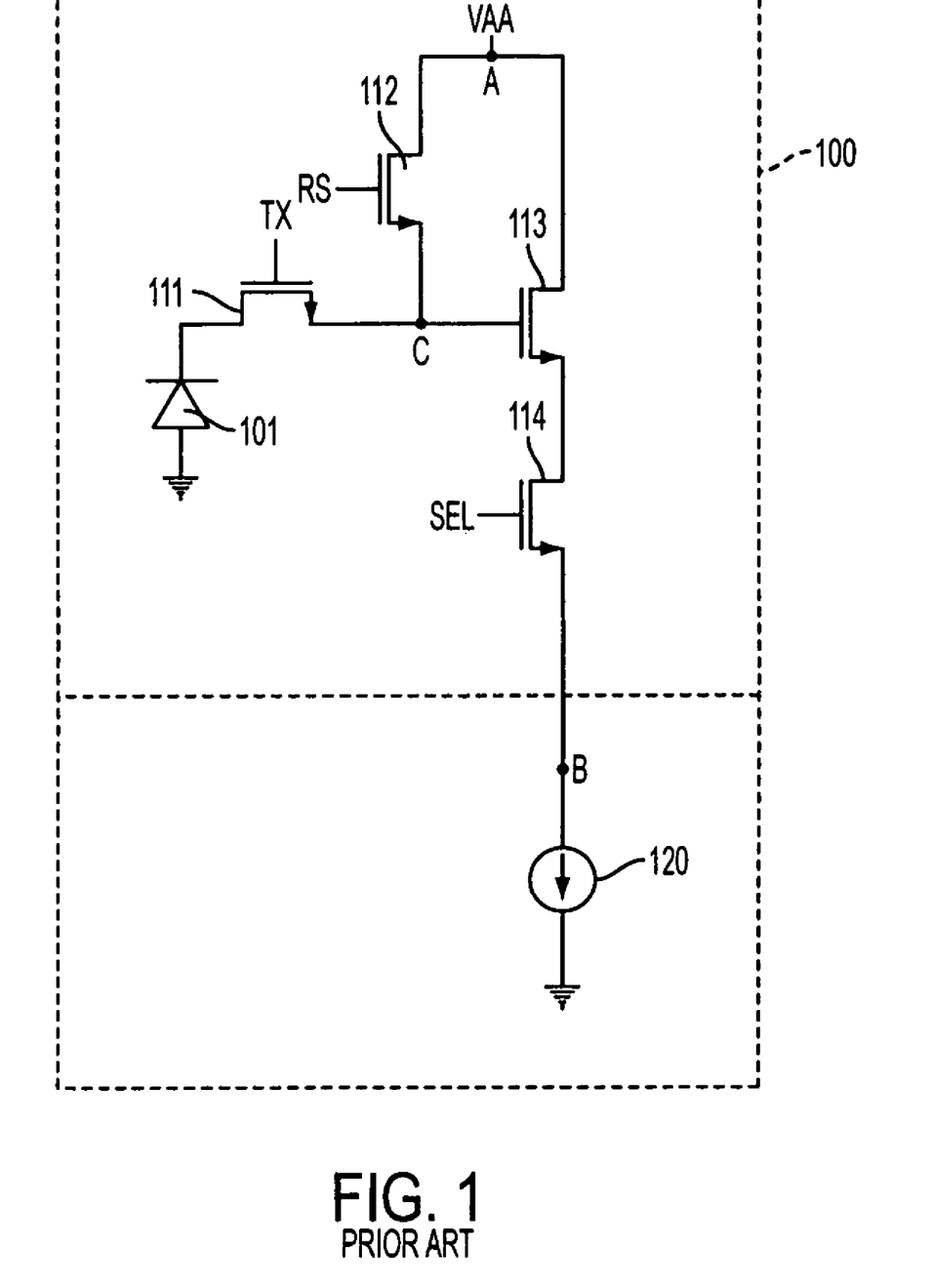
FIG. 1 illustrates a conventional pixel and an associated load circuit.

FIG. 1 is an illustration of a conventional four transistor (4T) pixel 100 and an associated load circuit 120 (shown as a current source). The pixel 100 includes a light sensitive element 101, shown as a photodiode, a floating diffusion region C, and four transistors: a transfer transistor 111, a reset transistor 112, a first source follower transistor 113, and a row select transistor 114. The pixel 100 accepts a TX control signal for controlling the conductivity of the transfer transistor 111, a RS control signal for controlling the conductivity of the reset transistor 112, and a SEL control signal for controlling the conductivity of the row select transistor 114. The charge at the floating diffusion region C controls the conductivity of the first source follower transistor 113. The output of the source follow transistor 113 is presented to the load circuit 120 through the row select transistor 114, which outputs a pixel signal at node B, when the row select transistor 114 is conducting (i.e., when SEL is asserted).

The states of the transfer and reset transistors 111, 112 determine whether the floating diffusion region C is coupled to the light sensitive element 101 for receiving photo generated charge generated by the light sensitive element 101 during a charge integration period, or a source of pixel power Vaapix from node A during a reset period.

The pixel 100 is operated as follows. The SEL control signal is asserted to cause the row select transistor 114 to conduct. At the same time, the RS control signal is asserted while the TX control signal is not asserted. This couples the floating diffusion region C to the pixel power Vaapix at node A, and resets the voltage at node C to the an initial voltage. The pixel 100 outputs a reset signal VRST to the load circuit 120. Node B is coupled between the row select transistor 114 and the load circuit 120 and serves as an input to a sample and hold circuit (not shown) that samples and holds the pixel reset voltage VRST.

After the reset signal VRST has been output, the RS control signal is deasserted. The light sensitive element 101 has been exposed to incident light and accumulates charge on the level of the incident light during a charge integration period. After the charge integration period and the output of the signal VRST, the TX control signal is asserted. This couples the floating diffusion region C to the light sensitive element 101. Charge flows through the transfer transistor 111 and diminishes the voltage at the floating diffusion region C. The pixel 100 outputs a photo signal VSIG to the load circuit 120 which appears at node B and is sampled by the sample and hold circuit (not shown). The reset and photo signals VRST, VSIG are different components of the overall pixel output (i.e., Voutput=VRST−VSIG).

A pixel 100 is susceptible to a type of distortion known as eclipsing. Eclipsing refers to the distortion arising when a pixel outputs a pixel signal corresponding to a dark pixel even though bright light is incident upon the pixel. Eclipsing can occur when a pixel is exposed to bright light, as the light sensitive element 101 can produce a large quantity of photo-generated charge. While the pixel 100 is outputting the reset signal VRST, a portion of the photogenerated charge produced by the light sensitive element 101 during an ongoing integration period may spill over the transfer transistor 111 into the floating diffusion node C. This diminishes the reset voltage at the floating diffusion node and can causes the pixel 100 to output an incorrect (i.e., diminished voltage) reset signal VRST. This, in turn, can cause the reset and photo signals VRST, VSIG to be nearly the same voltage. For example, the photo and reset signals VRST, VSIG may each be approximately 0 volts. The pixel output (VRST−VSIG) can therefore become approximately 0 volts, which corresponds to an output voltage normally associated with a dark pixel.

An anti-eclipse circuit can be used to minimize the effect of eclipsing. For example, since during an eclipse a pixel's reset voltage tends to drop towards zero volts, an anti-eclipse circuit can monitor the voltage level of the reset signal. If the voltage level drops below a threshold voltage, the anti-eclipse circuit can assume that the eclipsing may occur (or is occurring) and then correct the voltage level of the reset signal by pulling the reset level up to a correction voltage, thereby minimizing the eclipse effect.

Figure 2:
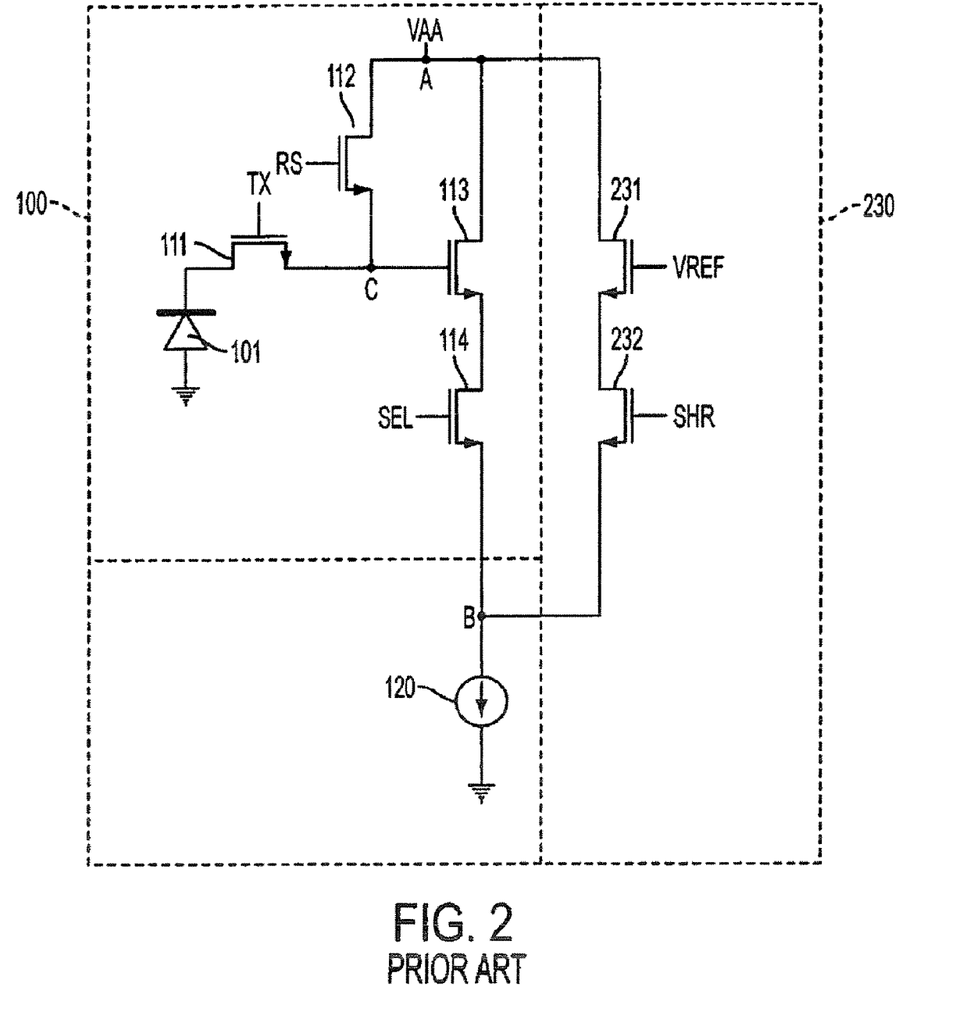
FIG. 2 illustrates a conventional pixel, a conventional load circuit, and conventional anti-eclipse circuit.

FIG. 2 is an illustration of the pixel 100, its load circuit 120, and a conventional anti-eclipse circuit 230 for overcoming the above-described eclipse problem. The anti-eclipse circuit 230 comprises a second source follower transistor 231 coupled in series with a switching transistor 232. The output of the switching transistor 232 is coupled in parallel with the output of the pixel 100 to the input of the load circuit 120 (i.e., to node B). The second source follower transistor 231 has one source/drain coupled to the pixel power Vaapix and another source/drain terminal coupled to the switching transistor 232. The second source follower transistor 231 is biased with a VREF control signal. The conductivity of the switching transistor 232 is controlled by a SHR (sample and hold reset) control signal which is used to sample and hold the VRST signal. The VREF voltage level is set so that if the voltage on the floating diffusion region C degrades while the reset signal VRST is being output, the second source follower transistor 231 conducts and pulls the voltage at node B up to VREF minus the threshold voltage of the second source follower transistor 231. One limitation of the anti-eclipse circuit 230 is to have a sufficient margin against possible variations of VRST. VRST is affected by threshold voltage variations of both reset transistor 112 and source follower transistor 113. In addition, temperature change, voltage change of VAA and a high level of the RS control pulse affect VRST. When anti-eclipsing is not needed, as in normal exposure conditions, current that flows through the second source follower transistor 231 should be zero in order to avoid any contribution from the anti-eclipse circuit 230. Therefore, VREF should be chosen as a sufficiently low voltage supposing a minimum value VRST variation, which results in reduced VREF voltage and causes difficulty in obtaining a sufficient output level for anti-eclipsing.

Accordingly, there is a need and desire for an improved anti-eclipse circuit for imagers.

BRIEF SUMMARY OF THE INVENTION

Exemplary embodiments of the invention provide an anti-eclipse circuit, and method of forming the same, comprising a pixel coupled to a pixel output line and a circuit for receiving and storing a pixel reset voltage from the pixel on the pixel output line and for using the stored pixel reset voltage as a parameter to control a reset voltage level on the output line in a manner which maintains the pixel reset voltage on the pixel output line above a predetermined minimum voltage.

BRIEF DESCRIPTION OF THE DRAWINGS

The foregoing and other advantages and features of the invention will become more apparent from the detailed description of exemplary embodiments provided below with reference to the accompanying drawings in which.

DETAILED DESCRIPTION OF THE INVENTION

In the following detailed description, reference is made to the accompanying drawings, which form a part hereof and show by way of illustration specific embodiments in which the invention may be practiced. These embodiments are described in sufficient detail to enable those skilled in the art to practice the invention, and it is to be understood that other embodiments may be utilized, and that structural, logical, and electrical changes may be made without departing from the spirit and scope of the present invention. The progression of processing steps described is exemplary of embodiments of the invention; however, the sequence of steps is not limited to that set forth herein and may be changed as is known in the art, with the exception of steps necessarily occurring in a certain order.

The term "pixel," as used herein, refers to a photo-element unit cell containing a photosensor and associated transistors for converting photons to an electrical signal. For purposes of illustration, a small number of representative pixels are illustrated in the figures and description herein; however, typically fabrication of a large plurality of like pixels proceeds simultaneously. Accordingly, the following detailed description is not to be taken in a limiting sense, and the scope of the present invention is defined only by the appended claims.

In addition, although the invention is described below with reference to a CMOS imager, the invention has applicability to any solid state imaging device having a storage node which is reset and then has charges transferred to it. The following detailed description is, therefore, not to be taken in a limiting sense, and the scope of the present invention is defined only by the appended claims.

Figure 3A:
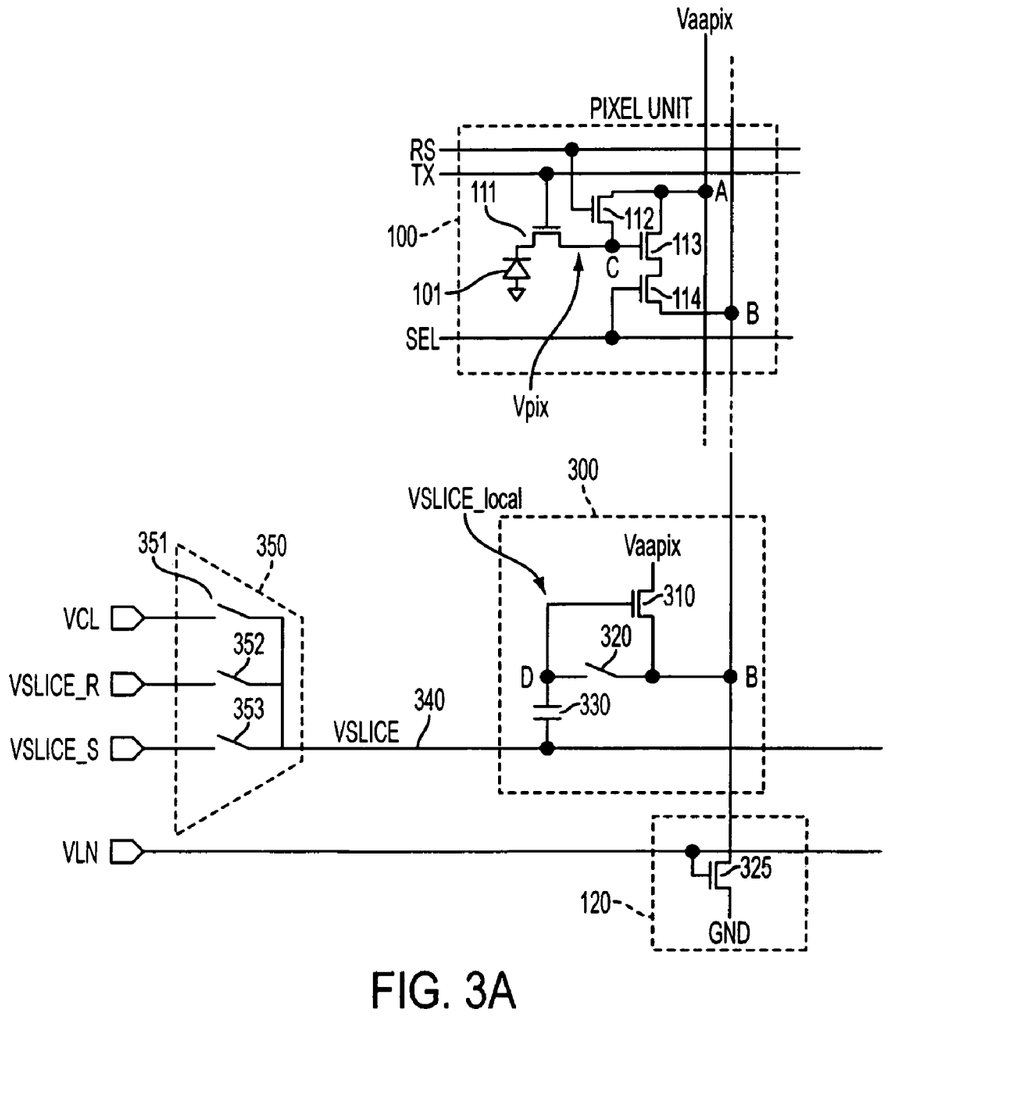
FIGS. 3A, 3B, and 3C illustrate a pixel, a load circuit, and an anti-eclipse circuit constructed in accordance with three exemplary embodiments of the invention.

Now referring to the figures, where like numerals designate like elements, FIG. 3A shows a first embodiment of the invention, which includes pixel circuit 100, a clip circuit 300, and a global multiplex circuit 350. Pixel circuit 100 is the same as that described in connection with FIG. 1. Clip circuit 300 includes a clip transistor 310, a clamp switch 320, a memory capacitor 330, and VSLICE_local node D. Global multiplex circuit 350 includes a first control switch 351, a second control switch 352, and a third control switch 353. Clip circuit 300 is connected to pixel 100 at node B. Clip transistor 310 is connected at its drain to Vaapix (node A), and at its source is coupled to the first terminal of clamp switch 320 and thus to a column line of an imager. The gate of clip transistor 310 is coupled to VSLICE_local node D. The second terminal of clamp switch 320 is also connected to node D. Memory capacitor 330 is coupled at one terminal to node D. The other terminal of memory capacitor 330 is connected a common VSLICE bus 340. Global multiplex circuit 350 drives the VSLICE bus 340 through the three control switches 351, 352, and 353. The three switches enable voltage output of signals VCL, VSLICE_R and VSLICE_S, respectively, where VSLICE_R>VCL>VSLICE_S. Load circuit 120 is represented as a load transistor 325 and signal VLN connected at the gate of load transistor 325.

Figure 4A:
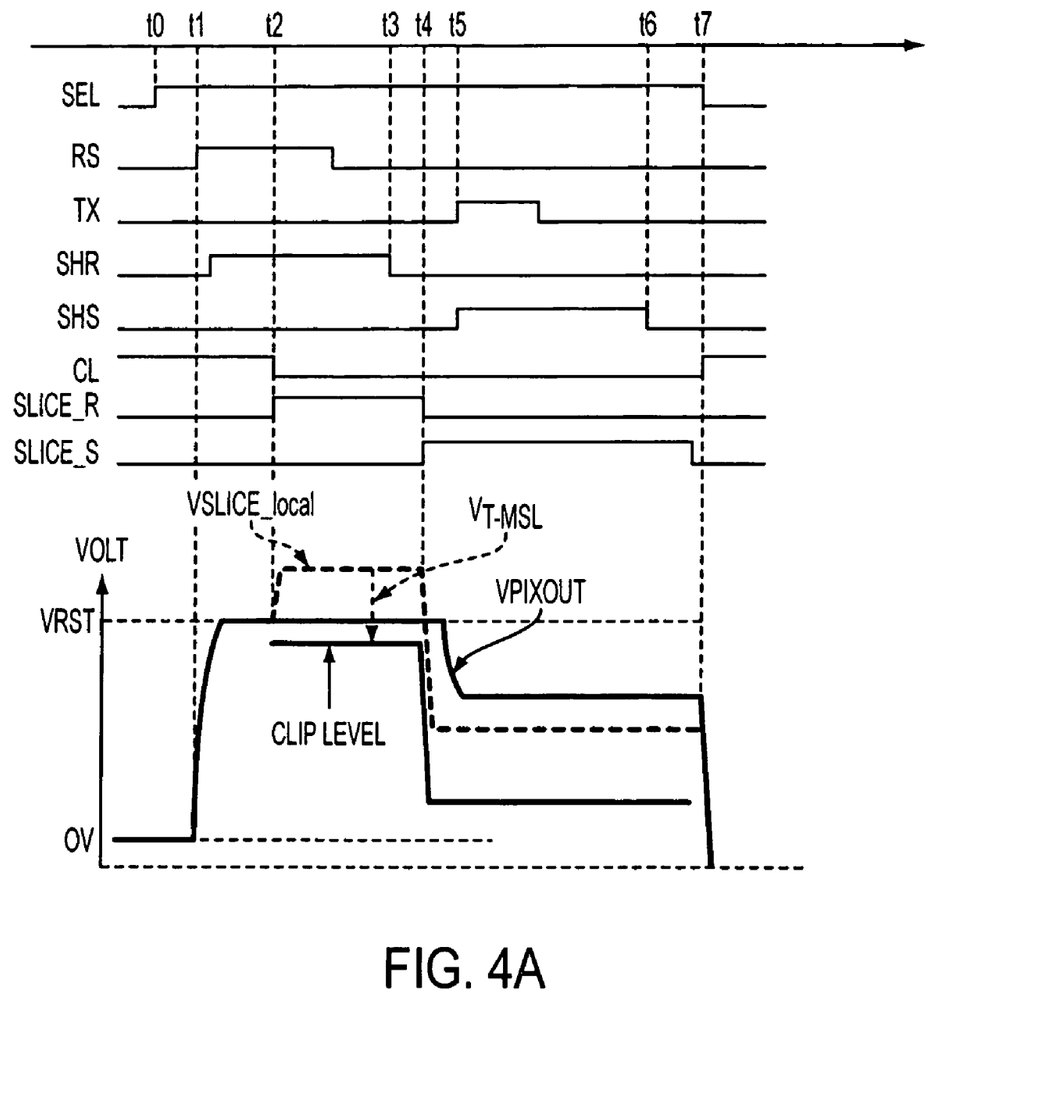
FIGS. 4A, 4B, and 4C are timing diagrams showing the signal timing and waveform of the exemplary embodiments of the invention associated with the FIGS. 3A, 3B, and 3C embodiments.

FIG. 4A describes an exemplary operation of the embodiment illustrated in FIG. 3A and also illustrates the reset voltage VRST level during operation of the FIG. 3A circuit. At time t0, row select signal SEL is applied to the pixel 100 so that the pixel 100 is selected. Reset signal RS is pulsed and applied to reset transistor 112 at time t1. The voltage Vpix at node C goes up to VDD (high level of the RS pulse)-VT-MRS, where saturation mode operation of reset transistor 112 is assumed and VT-MRS is a threshold voltage of reset transistor 112. The Vpix is set as the Vpix initial voltage Vpix(rst). Pixel 100 outputs a reset signal VRST according to the following equation, where MRD is a threshold voltage of source follower transistor 113.

$$VRST = Vpix(rst) - V_{T\text{-}MRD}$$

Clamp switch 320 and switch 351 also close at time t1 when CL is pulsed. VRST is input at Vslice_local node D in the clip circuit 300. At time t2, CL is deasserted and clamp switch 320 turns off, and switch 352 closes when SLICE_R is asserted high, so that the Vslice_local voltage at node D changes to, $$VSLICE\_local(rst) = VRST + (VSLICE\_R - VCL)$$

where memory capacitor 330 is much larger than parasitic capacitance at node D of Vslice_local so that ΔVSLICE~ΔVSLICE_local. VSLICE_local(rst) is equivalent to VSLICE_R in the clip circuit and determines minimum level of Vpixout for reset duration and prevents the eclipse artifact.

The clip voltage for node B of Vpixout is then, $$V\text{clip}(rst) = VRST + (VSLICE\_R - VCL) - V_{T\_MSL}$$

where $V_{T\_MSL}$ is the threshold voltage of clip transistor 310.

Following VRST sampling to an external memory (not shown) when SHR is deasserted at time t3, SLICE_R is deasserted so that switch 352 opens and SLICE_S is asserted so that switch 353 closes at time t4. Then VSLICE_local and clip voltages change to, $$VSLICE\_local(sig) = VRST + (VSLICE\_S - VCL)$$

$$V\text{clip}(sig) = VRST + (VSLICE\_S - VCL) - V_{T\_MSL}.$$

At time t5 TX is asserted and transfer transistor 111 turns on and photo generated charge accumulated at photodiode 101 is transferred from photodiode 101 to the floating diffusion node C, dropping Vpix then Vpixout as well. The Vpixout after the charge transfer is VSIG and sampled at another external memory (not shown) when sample and hold signal SHS is asserted during time t5 and time t6. The voltage collected by photosensor 101 can be obtained by subtracting VSIG from VRST. On the other hand, the clip voltage Vclip (sig) limits the minimum Vpixout in order to avoid bias current cut-off when the pixel is in saturation. Clip voltages are based on reset voltage VRST that includes all VT variations of threshold voltages of reset transistor 112 and source follower transistor 113, VT-MRS and VT-MRD of a pixel. Therefore, variations of these threshold voltages no longer affect the necessary margin for setting clip voltages and results in wider dynamic range. In addition, change over time of VRST due to temperature drift and/or power supply change can also be ignored, so it accomplishes adjustment without such changes.

Figure 3B:
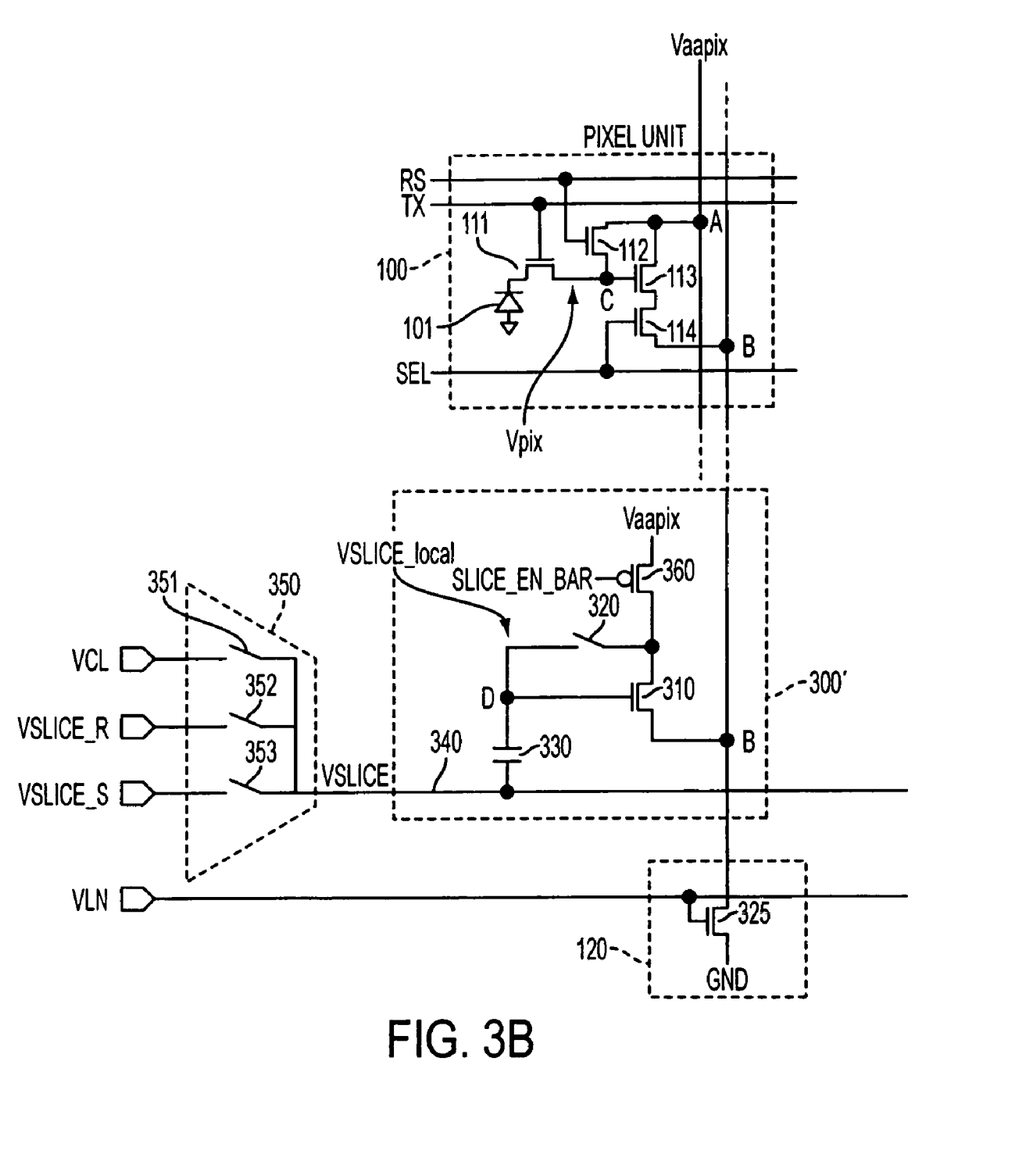

FIG. 3B illustrates a second embodiment of the invention. In comparison with FIG. 3A, a Vaapix enable transistor 360 is additionally implemented in clip circuit 300'. Vaapix enable switch 360 may be very small, as it is used to charge memory capacitor 330. Also, the location of clamp switch 320 is changed to the drain side of the clip transistor 310.

Figure 4B:
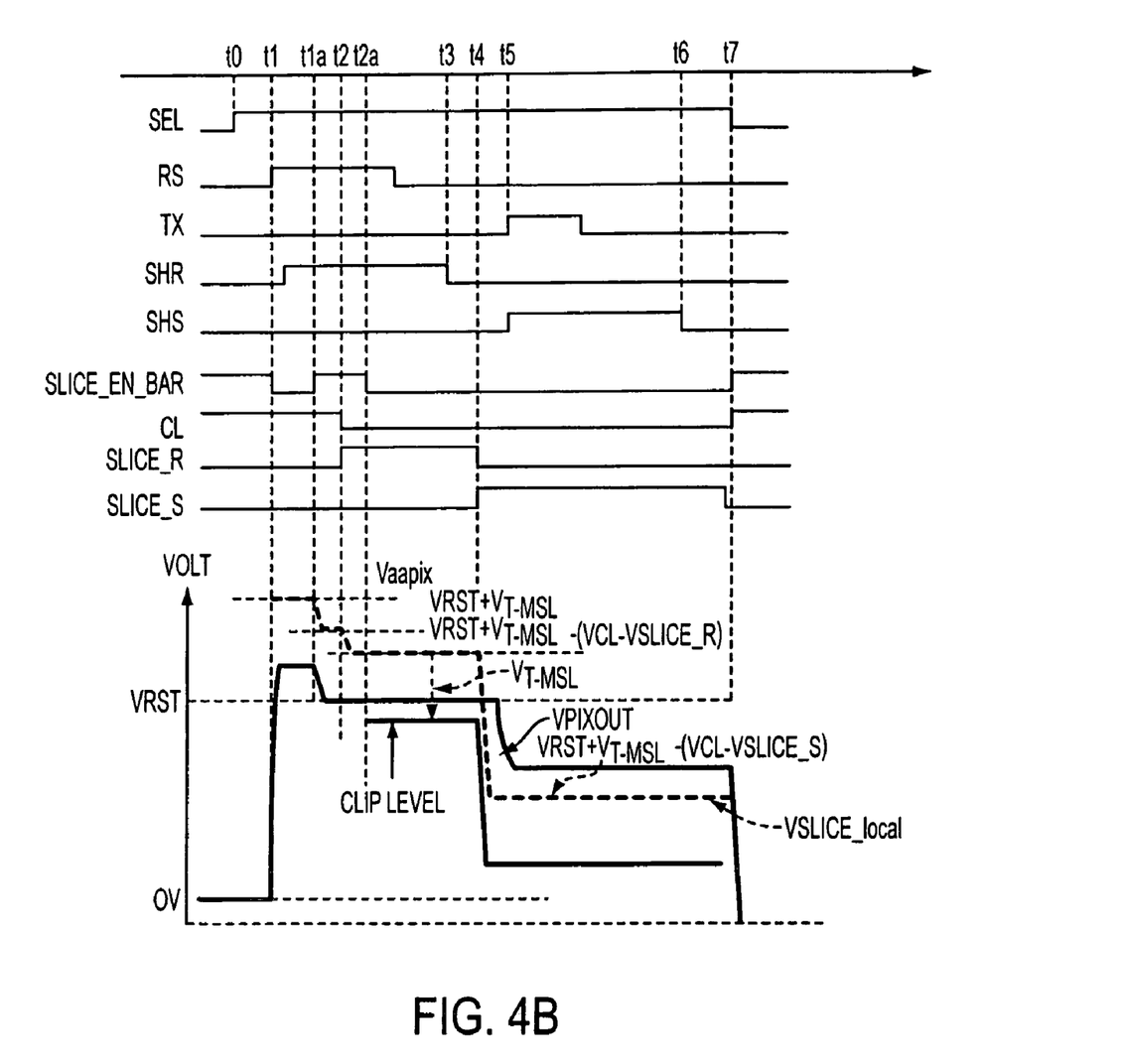

FIG. 4B describes the an exemplary operation of the embodiment illustrated in FIG. 3B and shows the resulting VRST signal during circuit operation. At time t0, row select signal SEL is applied to the pixel 100 so that the pixel 100 is selected. Reset signal RS is pulsed and charging signal SLICE_EN_BAR is deasserted at time t1. Since the signal CL is pulsed, node D is connected with the Vaapix through Vaapix enable transistor 360 at this time. At time t1a, charging signal SLICE_EN_BAR is asserted and the Vslice_local node D and drain node of clip transistor 310 are both disconnected from Vaapix, so that the Vslice_local voltage decreases with the charge that flows through clip transistor 310. When Vpixout node B voltage decreases following decrease of the Vslice_local voltage and reaches VRST, the clip circuit 300 becomes inactive. When Vpixout will be clipped at VRST, the channel current of clip transistor 310 is effectively cut-off and the voltage at Vslice_local is set at VRST+VT-MSL. After the Vslice_local is sufficiently stable, clamp switch 320 opens at time t2 and the VRST+VT-MSL is stored at the Vslice_local node D.

Following VRST sampling period, charging signal SLICE_EN_BAR turns off at time t2a to enable the clip circuit after VSLICE bus 340 voltage is changed from signal VCL to signal VSLICE_R at time t2. The clip level for the Vpixout node for the VRST sampling period is then, $$\begin{aligned}V\text{clip}(rst) &= V\text{slice\_local}(rst) - V_{T\_MSL}\\ &= VRST + V_{T\_MSL} - (VCL - VSLICE\_R) - V_{T\_MSL}\\ &= VRST - (VCL - VSLICE\_R)\end{aligned}$$

and the VT_MSL no longer contributes the clip level. Also for the VSIG sampling period, clip level Vclip(sig) can be expressed as the following equation and there is no contribution from VT_MSL as well during the VRST sampling period.

$$\begin{aligned}V\text{clip}(sig) &= V\text{slice\_local}(sig) - V_{T\_MSL}\\ &= VRST + V_{T\_MSL} - (VCL - VSLICE\_S) - V_{T\_MSL}\\ &= VRST - (VCL - VSLICE\_S)\end{aligned}$$

Accordingly, using a pulsed power supply method as explained above, the variation of the VT_MSL can be cancelled, which improves the performance of the clip circuit.

Figure 3C:
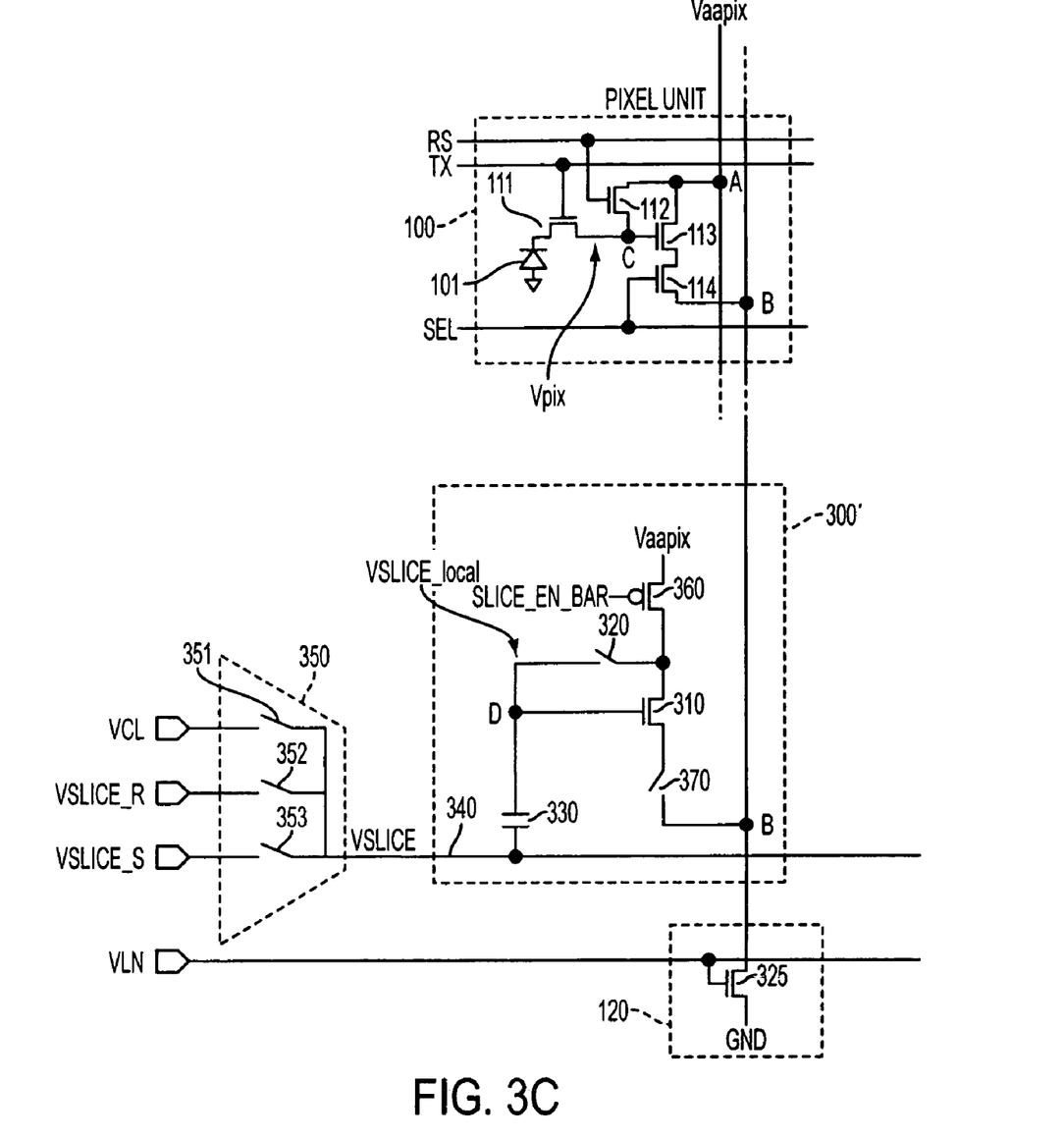

FIG. 3C shows a third embodiment of the invention. In comparison with the configuration of the embodiment shown in FIG. 3B, a DC current switch 370 is introduced between clip transistor 310 and Vpixout node B in clip circuit 300". Second switch 370 is kept open when the drain voltage of clip transistor 310 is driven to Vaapix, so that no DC current flows during the charge up period of memory capacitor 330.

Figure 4C:
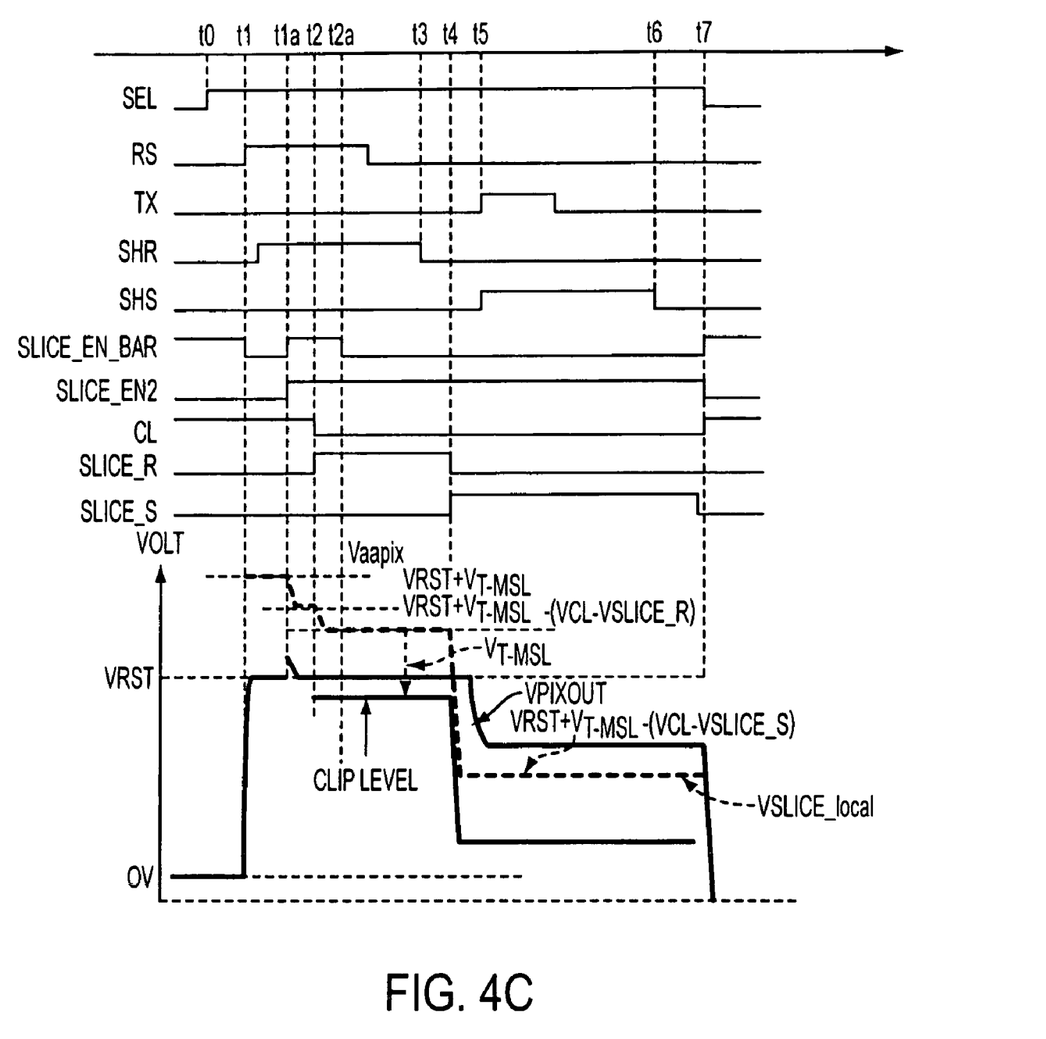

FIG. 4C describes the an exemplary operation of the embodiment illustrated in FIG. 3C. The operation is the same as that described in FIG. 4B, with an additional signal SLICE_EN2 that controls DC current switch 370. SLICE_EN2 is asserted at time t1a at the same time SLICE_EN_BAR is asserted, and SLICE_EN2 is deasserted at time t7 when SLICE_EN_BAR in reasserted. This causes the voltage at node B to stay at VRST from time t1 to time t1a to avoid affecting the sampled reset voltage.

Each imager may also be arranged in an array, or as part of a processing system. Clip circuit 300 and global multiplexer circuit 350 would be connected to each imager in the array at node B, which functions as a column line.

Figure 5:
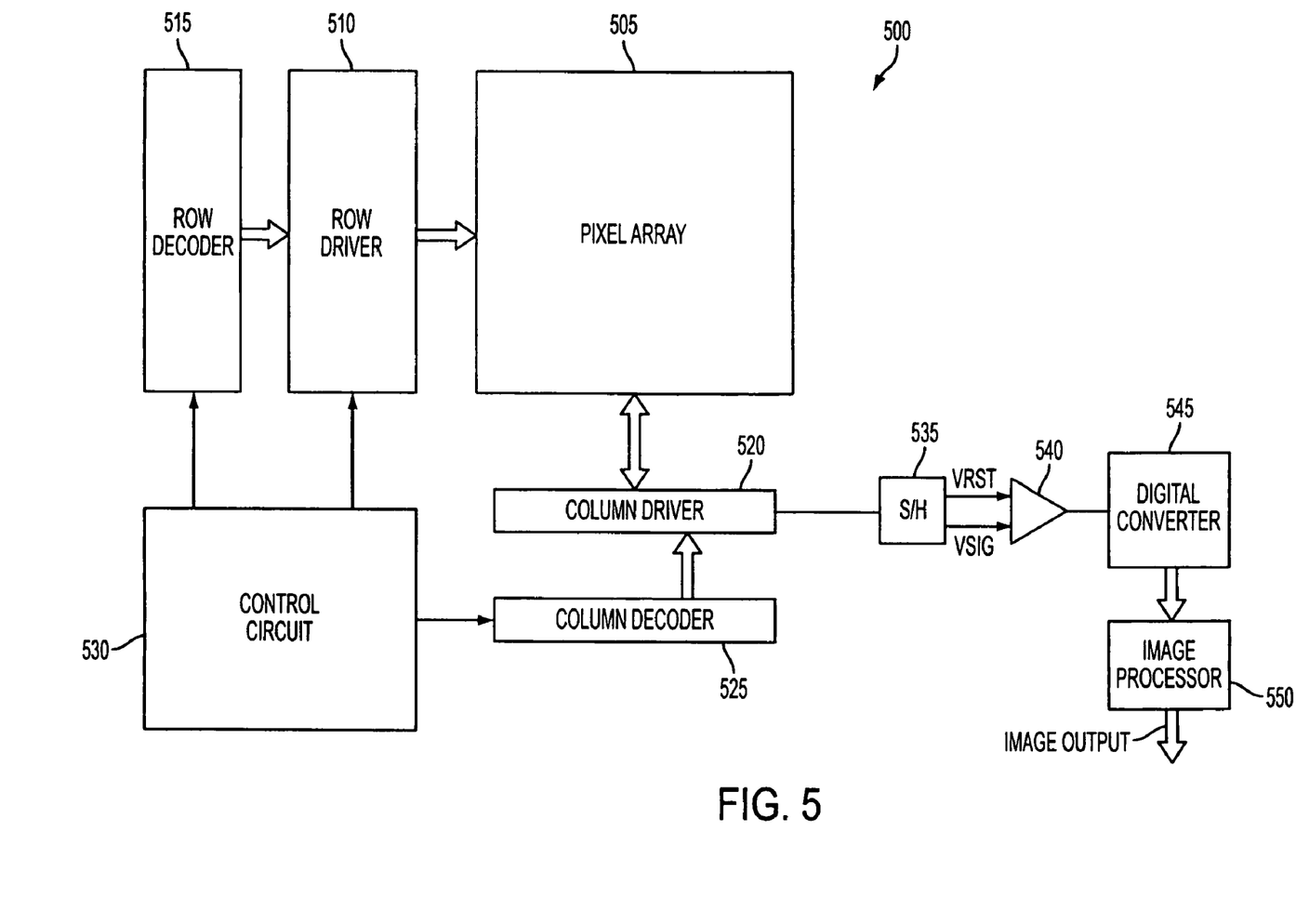
FIG. 5 is a block diagram of an imager, including an anti-eclipse circuit in accordance with the invention.

In FIG. 5, the CMOS imager 500 is operated by a control circuit 530, which controls address decoders 515, 525 for selecting the appropriate row and column lines for pixel readout. Control circuit 530 also controls the row and column driver circuitry 510, 520 so that they apply driving voltages to the drive transistors of the selected row and column lines. The clip circuit 300 is implemented in each column. The pixel output signals typically include a pixel reset signal VRST read out of the storage region after it is reset by the reset transistor and a pixel image signal VSIG, which is read out of the storage region after photo-generated charges are transferred to the region. The VRST and VSIG signals are sampled by a sample and hold circuit 535 and are subtracted by a differential amplifier 540, to produce a differential signal VRST−VSIG for each pixel. VRST−VSIG represents the amount of light impinging on the pixels. This difference signal is digitized by an analog-to-digital converter 545. The digitized pixel signals are fed to an image processor 550 to form a digital image output. The digitizing and image processing can be located on or off the imager chip. In some arrangements the differential signal VRST−VSIG can be amplified as a differential signal and directly digitized by a differential analog to digital converter.

Figure 6:
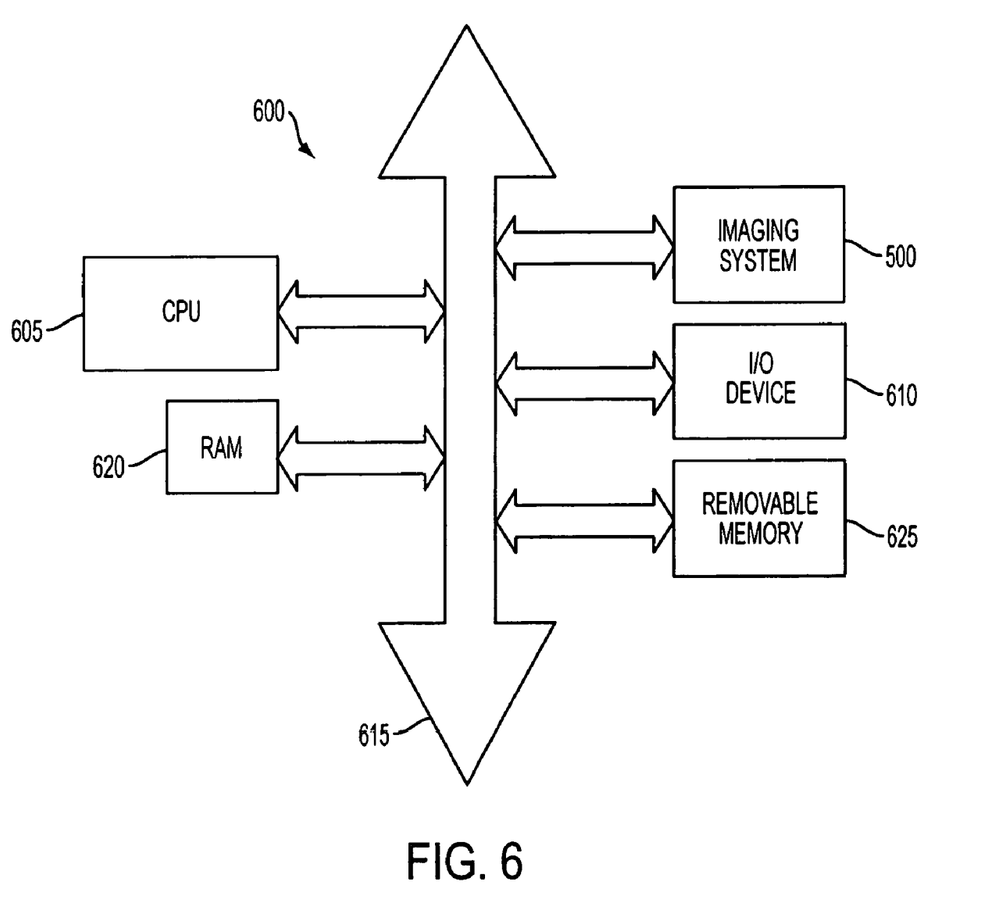
FIG. 6 illustrates a processing system incorporating the anti-eclipse circuit of the invention.

FIG. 6 illustrates a processor-based system 600, for example a camera system, which generally comprises a central processing unit (CPU) 605, such as a microprocessor, that communicates with an input/output (I/O) device 610 over a bus 615. The system 600 also includes an imaging device 500 constructed in accordance with any of the embodiments of the invention. Imager 500 also communicates with the CPU 605 over bus 615. The processor-based system 600 also includes random access memory (RAM) 620, and can include removable memory 625, such as flash memory, which also communicate with CPU 605 over the bus 615. Imager 500 may be combined with a processor, such as a CPU, digital signal processor, or microprocessor, with or without memory storage on a single integrated circuit or on a different chip than the processor.

Various embodiments of the invention have been illustrated using a photodiode as the charge conversion device, and in the environment of a four transistor pixel. It should be appreciated that, other types of photosensors and pixel architectures may be used to generate image charge. The invention may also be used in a readout circuit for a CCD (charge coupled device) array. Accordingly, it is not intended that the present invention be strictly limited to the above-described and illustrated embodiments. Any modifications of the present invention as described in the embodiments herein that falls within the spirit and scope of the following claims should be considered part of the present invention.

What is claimed as new and desired to be protected by Letters Patent of the United States is:

1. An imager comprising:
   a pixel coupled to a pixel output line; and
   a circuit configured to receive and store a pixel reset voltage from said pixel on said pixel output line and configured to use said stored pixel reset voltage as a parameter to control a reset voltage level on said output line in a manner which maintains said pixel reset voltage on said pixel output line above a predetermined minimum voltage, the circuit comprising:
      a storage capacitor;
      a switch for selectively coupling said output line to said storage capacitor;
      a transistor for biasing said output line to control the reset voltage level on said line, a gate of said transistor being coupled to said storage capacitor; and
      a switchable voltage source for switchably applying an additional voltage to said capacitor.

2. The imager of claim 1, wherein said output line is a column line of a pixel array.

3. The imager of claim 1, wherein said switchable voltage source comprises:
   a plurality of voltage source lines; and
   a second switch for selectively coupling a selected voltage source line to said capacitor.

4. The imager of claim 3, wherein said output line further receives a pixel output signal from said pixel and wherein said switch selectively couples a first voltage line having a first voltage higher than said predetermined minimum voltage to said capacitor before said output line receives said pixel output signal.

5. The imager of claim 1, wherein said transistor is coupled to a voltage supply line and selectively controls application of a voltage from said supply line to said output line in response to voltage on said capacitor.

6. A method of operating an imager comprising the steps of:
   receiving and storing a pixel reset voltage from a pixel on an output line and for using said stored pixel reset voltage as a parameter to control a reset voltage level on said output line in a manner which maintains said pixel reset voltage on said pixel output line above a predetermined minimum voltage;
   selectively coupling said output line to a storage capacitor;
   biasing said output line to control the reset voltage level on said line with a transistor, a gate of said transistor being coupled to said storage capacitor; and
   switchably applying an additional voltage to said capacitor with a switchable voltage source.

7. The method of claim 6, wherein said output line is a column line of a pixel array.

8. The method of claim 6, further comprising the step of receiving a pixel output signal from said pixel and selectively coupling a first voltage line having a first voltage higher than said predetermined minimum voltage to said capacitor before said output line receives said pixel output signal.

9. An imager array comprising:
   a plurality of imager circuits, at least one imager circuit of said plurality comprising:
      a pixel coupled to a pixel output line; and
      a circuit configured to receive and store a pixel reset voltage from said pixel on said pixel output line and configured to use said stored pixel reset voltage as a parameter to control a reset voltage level on said output line in a manner which maintains said pixel reset voltage on said pixel output line above a predetermined minimum voltage, the circuit comprising:
         a storage capacitor;
         a switch for selectively coupling said output line to said storage capacitor;
         a transistor for biasing said output line to control the reset voltage level on said line, a gate of said transistor being coupled to said storage capacitor; and
         a switchable voltage source for switchably applying an additional voltage to said capacitor.

10. The imager array of claim 9, wherein said output line is a column line of a pixel array.

11. The imager array of claim 9, wherein said switchable voltage source comprises:
    a plurality of voltage source lines; and
    a switch for selectively coupling a selected voltage source line to said capacitor.

12. The imager array of claim 11, wherein said output line further receives a pixel output signal from said pixel and wherein said switch selectively couples a first voltage line having a first voltage higher than said predetermined minimum voltage to said capacitor before said output line receives said pixel output signal.

13. The imager array of claim 9, wherein said transistor is coupled to a voltage supply line and selectively controls application of a voltage from said supply line to said output line in response to voltage on said capacitor.

14. A processing system comprising:
    a processor; and
    an imager array electronically coupled to said processor, said imager array comprising a plurality of imager circuits, at least one imager circuit of said plurality comprising:
       a pixel coupled to a pixel output line; and
       a circuit configured to receive and store a pixel reset voltage from said pixel on said pixel output line and configured to use said stored pixel reset voltage as a parameter to control a reset voltage level on said output line in a manner which maintains said pixel reset voltage on said pixel output line above a predetermined minimum voltage; the circuit comprising:
- a storage capacitor;
- a switch for selectively coupling said output line to said storage capacitor;
- a transistor for biasing said output line to control the reset voltage level on said line, a gate of said transistor being coupled to said storage capacitor; and
- a switchable voltage source for switchably applying an additional voltage to said capacitor.

15. The processing system of claim 14, wherein said output line is a column line of a pixel array.

16. The processing system of claim 14, wherein said switchable voltage source comprises:
- a plurality of voltage source lines; and
- a switch for selectively coupling a selected voltage source line to said capacitor.

17. The processing system of claim 16, wherein said output line further receives a pixel output signal from said pixel and wherein said switch selectively couples a first voltage line having a first voltage higher than said predetermined minimum voltage to said capacitor before said output line receives said pixel output signal.

18. The processing system of claim 14, wherein said transistor is coupled to a voltage supply line and selectively controls application of a voltage from said supply line to said output line in response to voltage on said capacitor.

19. A method of forming an imager pixel comprising the steps of:
- forming a pixel coupled to a pixel output line; and
- forming a circuit for receiving and storing a pixel reset voltage from said pixel on said pixel output line and for using said stored pixel reset voltage as a parameter to control a reset voltage level on said output line in a manner which maintains said pixel reset voltage on said pixel output line above a predetermined minimum voltage; wherein forming the circuit comprises:
  - forming a storage capacitor;
  - forming a switch for selectively coupling said output line to said storage capacitor;
  - forming a transistor for biasing said output line to control a reset voltage level on said line, a gate of said transistor being coupled to said storage capacitor; and
  - forming a switchable voltage source for switchably applying an additional voltage to said capacitor.

20. The method of claim 19, wherein said step of forming a circuit further comprises forming said output line as a column line of a pixel array.

21. The method of claim 19, wherein said step of forming the switchable voltage source comprises:
- forming a plurality of voltage source lines; and
- forming a switch for selectively coupling a selected voltage source line to said capacitor.

22. The method of claim 21, wherein said output line is formed to receive a pixel output signal from said pixel and wherein said switch is formed to selectively couple a first voltage line having a first voltage higher than said predetermined minimum voltage to said capacitor before said output line receives said pixel output signal.

23. The method of claim 19, wherein said step of forming the transistor further comprises forming said transistor to be coupled to a voltage supply line and to selectively control application of a voltage from said supply line to said output line in response to voltage on said capacitor.

24. An imager comprising:
- a pixel for supplying a pixel reset voltage; and
- a circuit configured to monitor said pixel reset voltage and configured to produce in response to said monitored pixel reset voltage a voltage on the line which has a waveform which starts at a nominal voltage, then increases to maintain a differential above a predetermined minimum voltage until an output of said pixel is read out, the circuit comprising:
  - a storage capacitor;
  - a switch for selectively coupling said output line to said storage capacitor;
  - a transistor for biasing said output line to control the reset voltage level on said line, a gate of said transistor being coupled to said storage capacitor; and
  - a switchable voltage source for switchably applying an additional voltage to said capacitor.

* * * * *